May 28, 1935.  H. H. ICE  2,002,577
HYDRAULIC SAFETY PIPE LINE REPAIR DEVICE
Filed Feb. 4, 1931
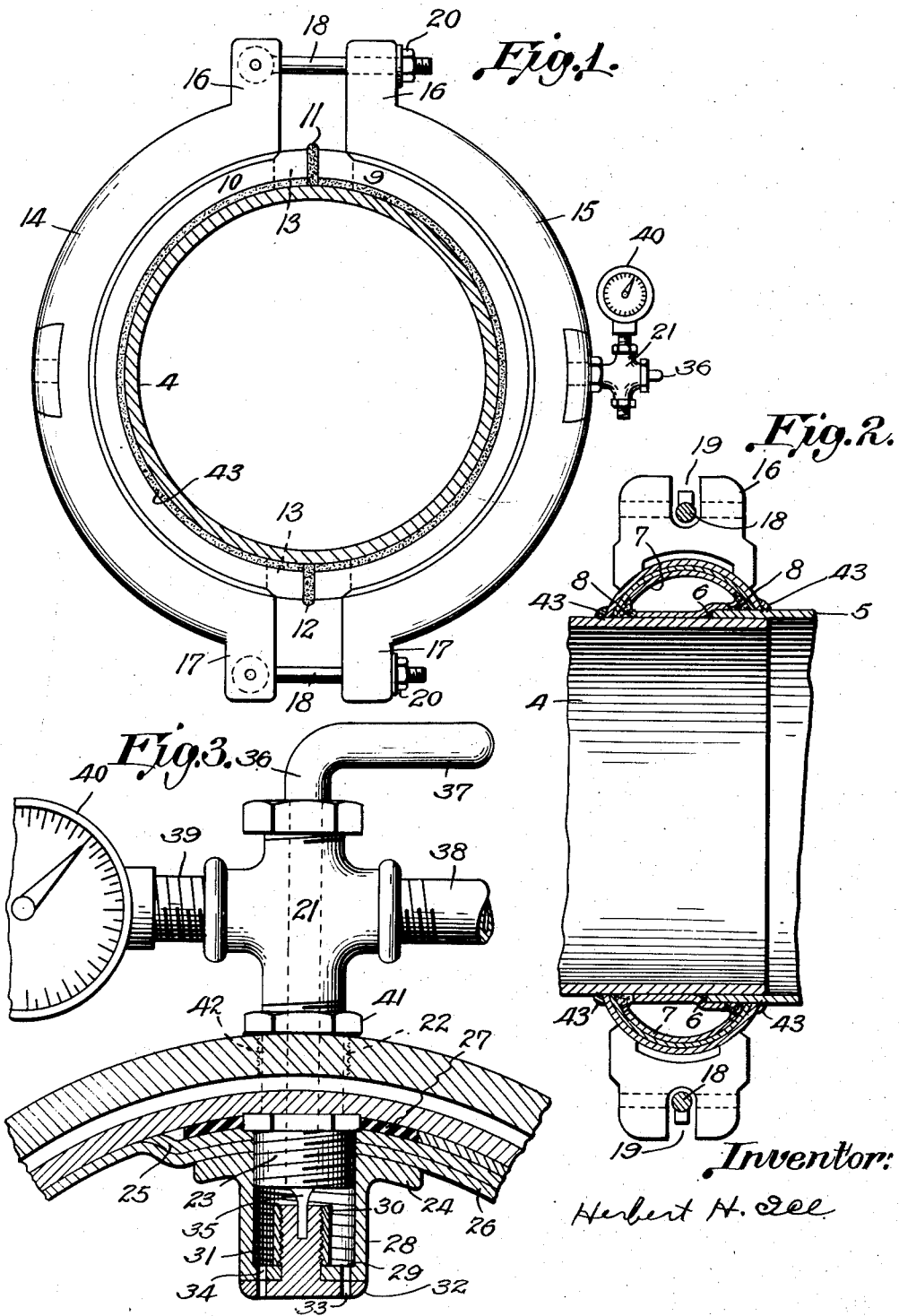
Inventor:
Herbert H. Ice Patented May 28, 1935

2,002,577

UNITED STATES PATENT OFFICE 2,002,577

HYDRAULIC SAFETY PIPE LINE REPAIR DEVICE

Herbert H. Ice, Muskogee, Okla.

Application February 4, 1931, Serial No. 513,372

1 Claim. (Cl. 137—99)

In pipe-lines which convey oil or gas, and while "alive", leaks frequently occur, and especially at the welded joints, and up to the present time, no means or devices have been produced to mend or weld these breaks, without first emptying or reducing the line pressure.

This invention is therefore directed to means for mending such breaks or leaks while the line is "alive", and the invention includes means for primarily sealing the leak preparatory to welding by electric welding.

Said invention therefore constitutes both a pressure seal, and means to hold the encasing means during the welding operation.

The invention is shown in detail on the sheet of drawings, accompanying and forming a part of the specification.

Figure 1 is a side elevational view of the clamping means, the welding clamp, and an end view of the pipe, and also there is shown a pressure gauge to determine the pressure in the sealing device.

Figure 2 is a partial cross-sectional view of Figure 1, and

Figure 3 is an enlarged detail view of the pressure device, including a removable stem, gauge, and means for delivering the pressure in the sealing device.

In the views, like references will indicate like parts.

In Figures 1 and 2, the numeral 4 indicates a pipe in the line, and is shown in Figure 2 as inserted into the bell 5 of an adjoining pipe, and the pipe 4 and bell 5 are welded together at 6. As stated, here at this weld is usually where the break occurs, and, ordinarily, the line must be emptied before the break can be repaired.

The first operation with the present invention is to place a flexible and expansible casing or tubing over the leak or break, and this casing or tubing will encircle the pipe. This element is designated by 7 and is constituted of rubber composition, fabric and edges 8 of asbestos to resist the heat during the welding operation.

To this tubing are applied two sections 9 and 10, of metal which not only take over this tubing, but are formed to fit both the pipe 4 and the bell 5, as can be clearly seen in Figure 2—for instance, by way of example—if the line is a 12 inch bell-joint line, the bore of the shield on the left hand side of Figure 2 will be 12 and ¾ inches, while that on the right hand side of the view will be 13 and $\frac{3}{32}$ inches, and if butt-joints or collar is used, the bore will be 12 and ¾ inches on both sides. Or if preferred, the sections 9 and 10 can be made sufficiently long to set entirely over a bell-joint, a collar joint, or a butt-weld joint, in which case, the bore on both sides would be 12 and ¾ inches.

These shields 9 and 10 approximate each other at their ends, after being placed about the element 7, as seen in Figures 1 and 2, but leave between each section 9 and 10 sufficient space to receive the welding material 11 and 12, and, as seen, to prevent the welding material from burning the element 7, each shield on one of its inner edges is provided with an extending lip 13, in Figures 1 and 2, and which slip under the adjoining shield and also act as guides for the alignment of the shields 9 and 10. These lips not only provide protection to the tube 7, but also become a part of the weld.

To the outside of the shields 9 and 10, a pair of clamping irons 14 and 15 are placed each having ears 16 and 17, into one of each of which is journalled a bolt 18, while the companion ear is bifurcated as at 19 to receive said bolt, and the nut 20 being turned will clamp these irons tightly about the sections 9 and 10 and the element 7.

To inflate the element 7 after application, a valve structure is provided, which may be understood by reference to Figure 3. A connection of a four-way-branch type is designated by 21 and is provided with a stem 22 which passes through the clamping irons and into threaded openings in the shields 9 and 10, and this stem being externally screw-threaded, receives a bushing, also externally screw-threaded. The tube or casing is overlapped about the pipes 4 and 5, as seen in Figure 3, and to the bushing 23, a clamp 24 is applied for holding the overlapping ends 25 and 26 of the tubing 7. The interposition of a washer 27 provides a cushion for the connection at this point. The clamp 24 has a depending bushing 28, with a perforated base 29 upward from which is a screw-threaded nipple 30. Into this nipple 30 is screw-threaded a stud 31 formed as a part of the perforated plate 32, having perforations 33 to register at will with the perforations 34 in the bottom of the bushing aforesaid. Into a slot in the stud 31 extends a reduced portion 35 of a stem 36 which passes upward and through the parts and the connection 21, terminating in a handle 37.

From the connection 21 extends to lateral branches providing for the reception of pipes 38 and 39, the former to reach to a check valve not shown, and the latter to a pressure gauge.

Pressure is admitted through 38, and connection 21 down in and through 22, and eventually out through ports 34 and 33, into the element 7. When the latter is inflated, stopping the leak, the stem is turned, turning also the plate 32, and causing the ports not to register which holds the pressure in the element 7 and the member 36 may now be withdrawn. Before this is done, however, assuming the "alive" line pressure to be 500 pounds, the gauge ought to show 510 or 520 pounds. This will stop the leak.

The welding may be performed now with safety, and when the welding operation is complete or even before, the jamb-nut 41 may be loosened and the stem 42 withdrawn by screwing it outwardly anticlockwise from the bushing 23, but after the withdrawal of the element 36.

The welding banks at each intersection between the shields 9 and 10 and the pipe surfaces is shown as at 43. After the removal of the valve stem 22, from the bushing 23, a pipe plug may be inserted in its place to insure the maintenance of pressure when the tube 7 finally deteriorates.

Having set forth the invention I claim:

The method of repairing a broken pipe-line having an interior pressure greater than atmospheric pressure comprising disposing a flexible tubing over the broken portion of the pipe, disposing an enclosing ring over the tubing, applying clamping means to said ring, inflating said tubing with pressure higher than the pressure of the pipe, and welding the edges of said ring to the wall of the pipe.

HERBERT H. ICE.